United States Patent
Hata et al.

(10) Patent No.: US 6,480,616 B1
(45) Date of Patent: Nov. 12, 2002

(54) STATUS-OF-USE DECISION DEVICE FOR A SEAT

(75) Inventors: Satoshi Hata, Nagoya (JP); Jiro Nakano, Okazaki (JP); Hiroshi Uenaka, Okazaki (JP); Kazuo Kyuma, Yokohama (JP); Jun Ohta, Takarazuka (JP); Masaya Oita, Nishinomiya (JP)

(73) Assignees: Toyota Jidosha Kabushiki Kaisha, Toyota (JP); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/149,004

(22) Filed: Sep. 8, 1998

(30) Foreign Application Priority Data

Sep. 11, 1997 (JP) .............................................. 9-246794

(51) Int. Cl.$^7$ ................................................ G06K 9/00
(52) U.S. Cl. ....................................... 382/106; 280/735
(58) Field of Search ................................. 382/106, 103, 382/232, 100; 472/60; 73/865.3; 280/735; 250/203.4; 356/3

(56) References Cited

U.S. PATENT DOCUMENTS

| | | | | |
|---|---|---|---|---|
| 5,263,765 A | * | 11/1993 | Nagashima et al. | 297/284 |
| 5,298,732 A | * | 3/1994 | Chen | 250/203.4 |
| 5,585,625 A | * | 12/1996 | Spies | 250/221 |
| 5,753,834 A | * | 5/1998 | Stewart | 73/865.3 |
| 5,782,485 A | * | 7/1998 | Takeda et al. | 280/735 |
| 5,853,330 A | * | 12/1998 | Engstrand | 472/60 |
| 5,906,393 A | * | 5/1999 | Mazur et al. | 280/735 |
| 6,005,958 A | * | 12/1999 | Farmer et al. | 382/103 |
| 6,027,138 A | * | 2/2000 | Tanaka et al. | 280/735 |
| 6,055,335 A | * | 4/2000 | Ida et al. | 382/232 |
| 6,116,639 A | * | 9/2000 | Breed et al. | 280/735 |
| 6,198,998 B1 | * | 3/2001 | Farmer et al. | 701/45 |
| 6,252,240 B1 | * | 6/2001 | Gillis et al. | 250/559 |

* cited by examiner

*Primary Examiner*—Leo Boudreau
*Assistant Examiner*—Barry Choobin
(74) *Attorney, Agent, or Firm*—Pillsbury Winthrop LLP

(57) ABSTRACT

Predetermined multiple points of the front passenger seat and its periphery are irradiated with spot beams, caught with a camera, and distances are measured based on the irradiation position of the spot beams. Conversely, the characteristics for each status of use of the seat such as the shapes of the contour of the seat or the contour of a child seat are detected from the picture information caught with the camera. The status of use of the seat is decided based the characteristics for each status of use and the distance information that was previously measured. Based on this decision, the operation of a passive safety device such as an air bag device is controlled.

29 Claims, 20 Drawing Sheets

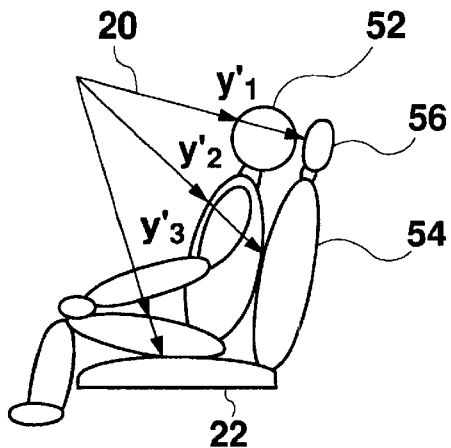
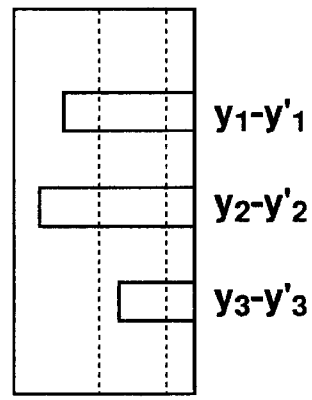
Fig. 11A    Fig. 11B
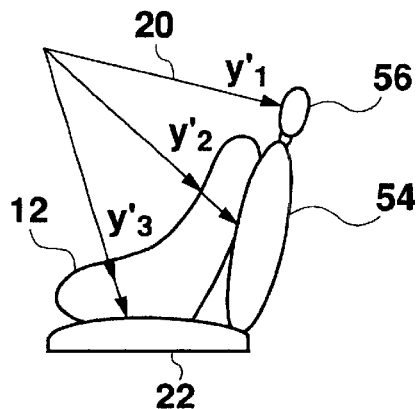
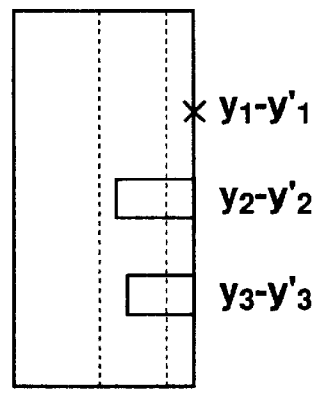
Fig. 12A    Fig. 12B
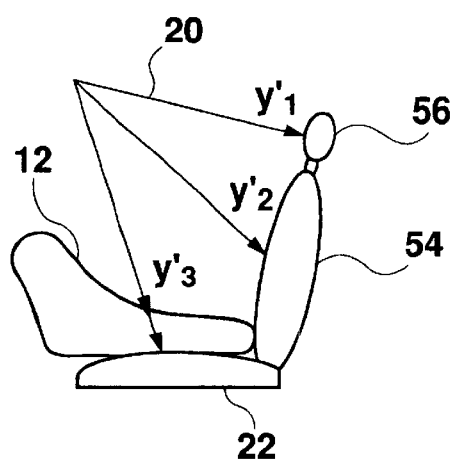
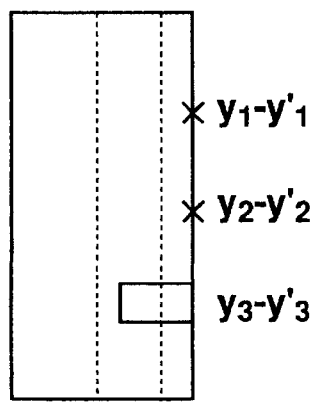
Fig. 13A    Fig. 13B

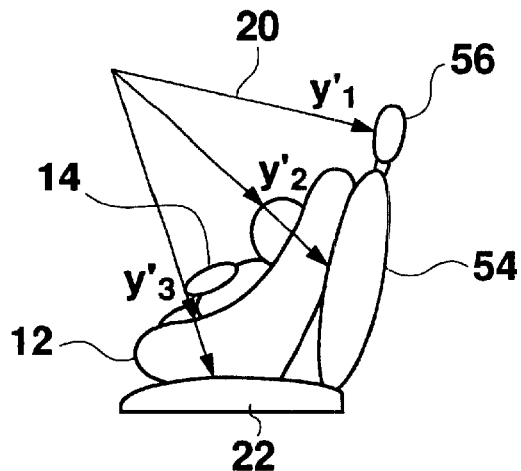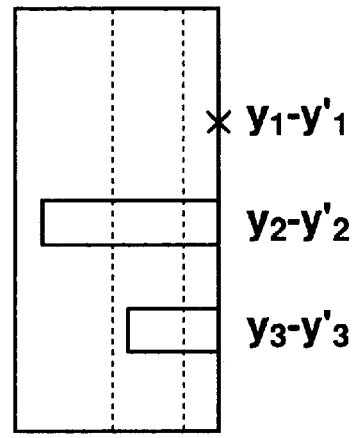
Fig. 14A    Fig. 14B
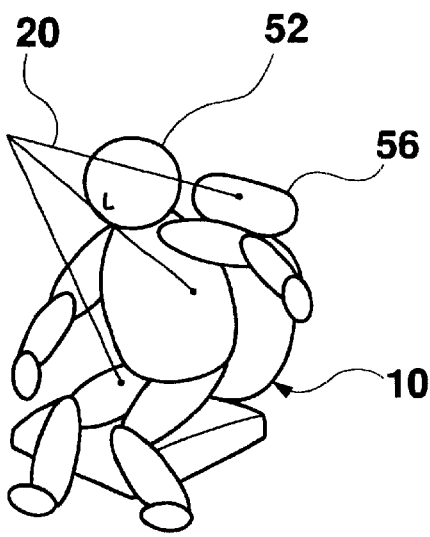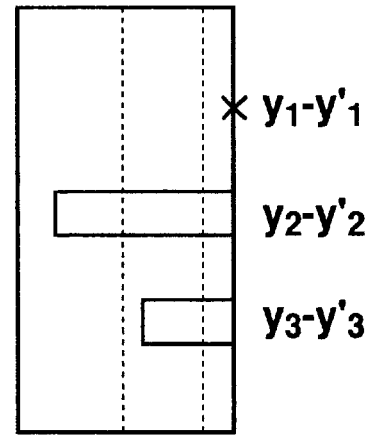
Fig. 15A    Fig. 15B

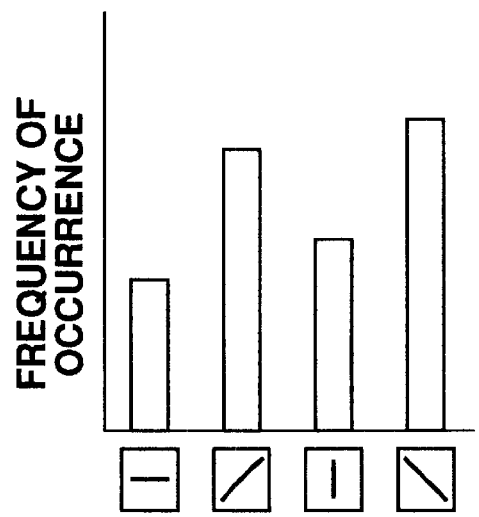
Fig. 25
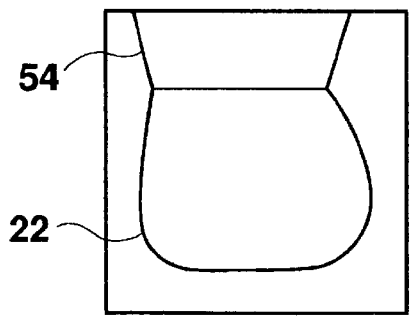 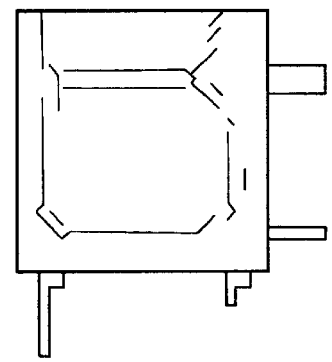
Fig. 26A    Fig. 26B
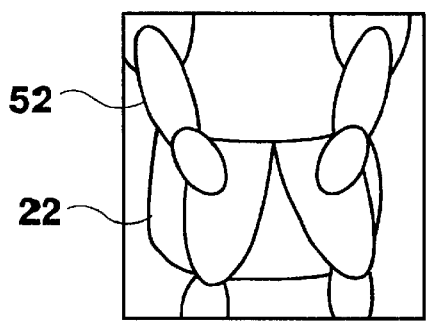 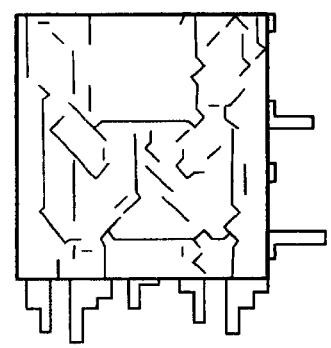
Fig. 27A    Fig. 27B

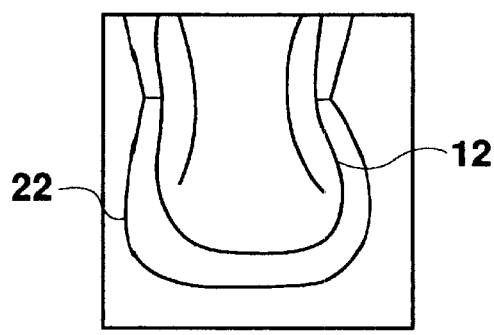
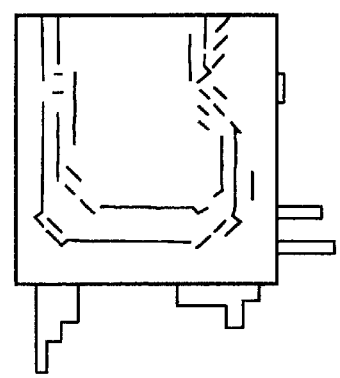
Fig. 28A     Fig. 28B
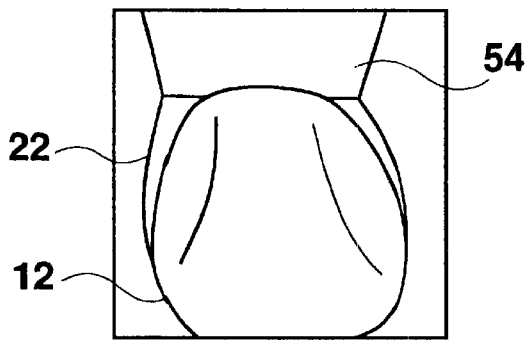
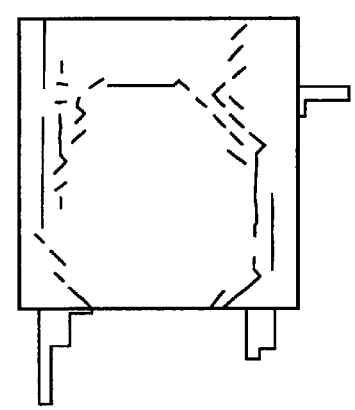
Fig. 29A     Fig. 29B
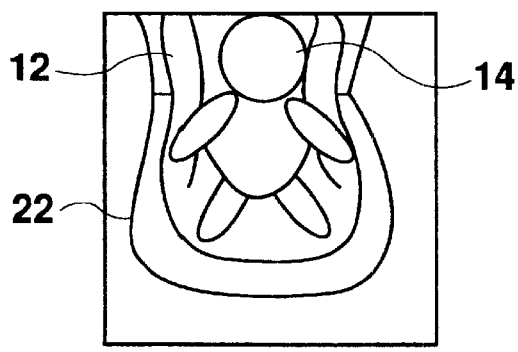
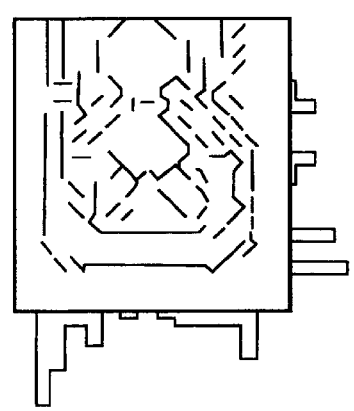
Fig. 30A     Fig. 30B

| CLASSIFI-CATION | TYPICAL PICTURE | | | |
|---|---|---|---|---|
| NO PASSENGER | 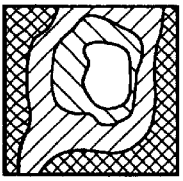 | | | |
| PASSENGER (ADULT) | 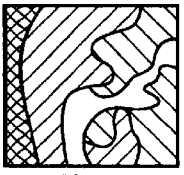 No. 1 | 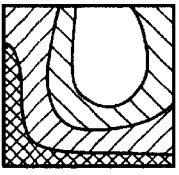 No. 2 | 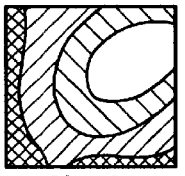 No. 3 | |
| PASSENGER (CHILD) | 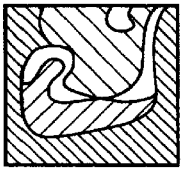 | | | |
| CHILD SEAT (FORWARD) | 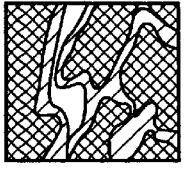 No. 1 | 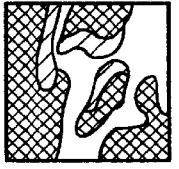 No. 2 | 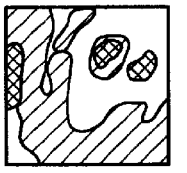 No. 3 | 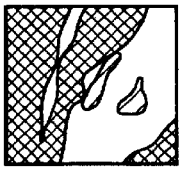 No. 4 |
| CHILD SEAT (BACKWARD) | 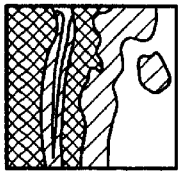 No. 1 | 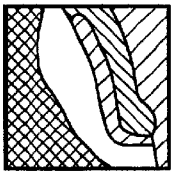 No. 2 | 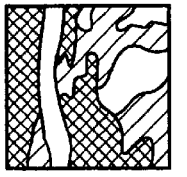 No. 3 | 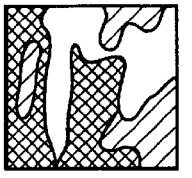 No. 4 |
Fig. 32

STATUS-OF-USE DECISION DEVICE FOR A SEAT

BACKGROUND OF THE INVENTION

1. Field of the Invention

The present invention generally relates to a device that decides the status of use of a seat, such as whether a person is seated on the seat or baggage is put on it, and more particularly relates to a device that controls the operation of a passive safety device such as an air bag device and a seat belt device according to the status of use of the seat, especially in cars.

2. Description of the Related Art

Passive safety devices are practically used to prevent passengers from colliding with the internal structure of their vehicles and to protect them when a vehicular accident occurs. Specifically, a passive safety device contains an air bag device and a seat belt device. The air bag device inflates an air bag between a passenger and the structure inside a vehicle if the vehicle is involved in a collision. This air bag functions as a cushion, catches the passenger, and prevents the passenger from colliding with the structure. The seat belt device secures the passenger to the seat and prevents the passenger from colliding with the structure. In particular, in recent years, seat belt devices with pretensioners have also been in practical use. These type of seatbelts secure passengers to seats more firmly by pulling in a predetermined length of a seat belt when vehicles collide. In addition, vehicles equipped with these passive safety devices on the front passenger seat as well as the driver's seat are in practical use.

The conventional passive safety device operates when vehicles collide even if a passenger is not seated on a seat, especially the front passenger seat. This operation is meaningless because the following problems arise. During repair, the dashboard (instrument panel) which stores the air bag, as well as the operated device, must be replaced, and so the repair cost is increased.

In Japanese Patent Laid-open Publication No. Hei 6-206514, there is disclosed a device that measures a distance from the predetermined position of a car body, for example, from the ceiling unit over the head of a passenger toward the seat and detects the presence of the passenger based on this distance.

In the device described in the publication, even when an attempt is made to detect the presence of a passenger based on the distance from the ceiling unit to the passenger, if baggage is put on the front passenger seat this might incorrectly be detected as the passenger seat. Besides, whether a child seat is installed forward or backward and whether or not a child is seated on the child seat cannot be sufficiently decided merely by measuring distance.

SUMMARY OF THE INVENTION

The present invention was made to solve the above mentioned issues. It is an object of the present invention to provide a status-of-use decision device for a seat that decides the status of use of the seat, and a passive safety device for the front passenger that appropriately operates based on the decision of this decision device.

In order solve the above issues, one status-of-use decision device for a seat related to the present invention has a distance measurement device that measures the distance from an upper predetermined point to predetermined multiple points on the seat and around the seat and obtains distance information, and a photographing device that photographs a range including at least a part of the seat and obtains picture information. It also has means for educing contours from the picture information and means for deciding the status of use of the seat based on the distance information and the shapes of the contours. According to the shapes of the educed contours, it can be used to decide to a certain extent whether the contours are those of the seat, those of an object put on the seat, or those of a passenger seated on the seat. Besides, because two-dimensional objects such as patterns of the seat and shades projected on the seat can be eliminated, the accuracy of decision is improved.

The status-of-use decision device for a seat can also have a seat movement sensor that detects movement by adjustment of the seat and a device that corrects the distance information based on the movement of the seat. It is known that seats equipped in vehicles can be moved forward and backward and up and down and that the angle of recline of the seats can be changed, and the obtained distance information differs depending on these movements. By providing the seat with a movement sensor and distance information correction device, the movements can be changed, thereby improving the accuracy of decision.

The status-of-use decision device for a seat can also have a device that calculates a fatigue change of the shape of the seat and allows the distance correction device to correct the distance information based on the movement of the seat and the change in shape of the seat. Accordingly, a fatigue change of the seat shape can also be suppressed, thereby improving the accuracy of decision.

Another status-of-use decision device for a seat related to the present invention has a device that photographs a range including at least a part of the seat and obtains picture information, means that detects the edge of the relevant picture based on the picture information, and means that decides the status of use of the seat based on the shape of the said edge. Herein, an edge is the portion where the difference of the picture information such as the light and shade of adjacent picture elements is particularly large, and this edge tends to collectively appear in the vicinity of the edge of an object. The seat and the shape of the object put on the seat can be accurately decided based on the shape of this edge.

The status-of-use deciding means that makes a decision based on the shape of the edge can decide that there is no person seated on a seat when the shape of the edge that appears in the vicinity of the edge on the seat side of the seat is detected.

The status-of-use deciding means that makes a decision based on the shape of the edge can decide that there is a person seated on a seat when the shape of the edge that appears in the vicinity of the contours of the legs of the person seated on the seat is detected. In particular, the accuracy of decision can be improved by making a decision based on the shape of the edge related to the seat side of the seat and that related to the legs of the person seated on the seat.

The status-of-use deciding means that makes a decision based on the shape of the edge contains an inclination calculation means that calculates the inclination of the edge and a frequency calculation means that calculates the frequency of occurrence for each inclination of the edge, and can determine the frequency of occurrence of the edge based on the shape of the edge.

The frequency calculation means can be made to divide the range of the photographed picture lengthwise and breadthwise by a predetermined number, and calculate the frequency of occurrence of the vertical edge for each column of the individual divided picture and that of the horizontal edge for each row.

Another status-of-use decision device for a seat related to the present invention has a photographing device that photographs the range including at least a part of the seat and obtains picture information, a memory that stores at least one typical picture for each status of use of the seat within the photographing range, and means that compares the picture information and the typical picture and decides the status of use of the seat. Each picture information actually obtained and the typical picture are compared, and the status of use to which more similar typical pictures belong is decided as the status of use of the current seat.

The status-of-use decision device has means that detects the edge of the relevant picture based on the picture information and generates an edge picture, and makes a decision through a comparison with the typical picture to decide the status of use of a seat by comparing the edge picture. The edge picture represents the difference of the picture information such as the brightness with adjacent picture elements in brightness. For example, the portion where the difference in the brightness of adjacent picture elements is large, that is, the portion where the edge is steep, is displayed in white, and the portion where the difference is small is displayed in black. In this case, for a stored typical picture, an edge picture can previously be stored or a normal picture can be stored and the edge picture can also be generated each time.

The status-of-use decision device can also be made to have a seat movement sensor that detects movement caused by adjustment of the seat and means that decides the typical picture to be compared based on the movement of the seat. Because the position of the seat in the photographed picture varies when the seat moves, the typical picture to be compared also needs to be changed accordingly. The configuration of the present invention can solve this problem.

Another status-of-use decision device of a seat related to the present invention can have a device that photographs a range including at lease a part of the seat and obtains the picture information, a memory that stores the picture information, and means that decides the status of use of the seat by comparing the picture information stored in the memory before a predetermined time and the picture information photographed at the current time. By comparing the previous picture information and the current picture information, the presence of movement can be detected and thus the presence of a passenger can be decided.

The status-of-use decision device that makes a decision based on the change of picture information has a movement area specifying unit that specifies the area with a large picture change by comparing the picture stored before the said predetermined time and the picture photographed at the current time, and can decide the status of use of the seat based on the position of the specified area.

Another status-of-use decision device of a seat related to the present invention has a temperature distribution photographing device that photographs a range including at least a part of the seat in the infrared region and obtains the temperature distribution and means that decides the status of use of the seat based on the temperature distribution. If there is a person seated on the seat, because the body surface of the person seated on the seat reaches the approximate temperature of the body, this can be detected.

The passive safety system that is another mode related to the present invention has at least one of the status-of-use decision devices of seats described above. Under the predetermined conditions, the passive safety device has a passive safety device that protects passengers from collision with the structure inside vehicles and a control unit that controls the operation of the passive safety device according to the status of use of the seat. If the passive safety device is provided with multiple status-of-use decision devices, it is desirable that predetermined weighting be applied to the decision results of each decision device and the status of use be comprehensively decided.

BRIEF DESCRIPTION OF THE DRAWINGS

FIG. 2 shows the state in which FIG. 1 is viewed from the top.

FIGS. 11A and 11B are drawings for describing the decision of the status of use of a seat using the distance measurement and illustrating the state in which an adult is seated on the seat.

FIGS. 12A and 12B are drawings for describing the decision of the status of use of a seat using the distance measurement and illustrating the state in which a child seat is installed forward.

FIGS. 13A and 13B are drawings for describing the decision of the status of use of a seat using the distance measurement and illustrating the state in which a child seat is installed backward.

FIGS. 14A and 14B are drawings for describing the decision of the status of use of a seat using the distance measurement and illustrating the state in which a child is seated on the child seat installed forward.

FIGS. 15A and 15B are drawings for describing the decision of the status of use of a seat using the distance measurement and illustrating the state in which an adult is seated on a seat and relaxes his or her position.

FIG. 25 is a drawing for describing the decision of the status of use of a seat according to the edge inclination and illustrating the frequency of occurrence for each edge type shown in FIG. 23.

FIGS. 26A and 26B are drawings for describing the decision of the status of use of a seat according to the edge inclination and illustrating the picture and the edge picture when there is no passenger.

FIGS. 27A and 27B are drawings for describing the decision of the status of use of a seat according to the edge inclination and illustrating the picture and the edge picture when an adult is seated on the seat.

FIGS. 28A and 28B are drawings for describing the decision of the status of use of a seat according to the edge inclination and illustrating the picture and the edge picture when a child seat is installed forward.

FIGS. 29A and 29B are drawings for describing the decision of the status of use of a seat according to the edge inclination and illustrating the picture and the edge picture when a child seat is installed backward.

FIGS. 30A and 30B are drawings for describing the decision of the status of use of a seat according to the edge inclination and illustrating the picture and the edge picture when a child is seated on the child seat installed forward.

FIG. 32 shows an example of the typical picture.

DESCRIPTION OF THE PREFERRED EMBODIMENTS

The embodiments of the present invention will now be described with reference to the drawings. Each embodiment described below indicates that the present invention is applied to a device that decides the status of use of the front passenger seat of a car and a passive safety device that is operated based on the decision of this device.

First Embodiment

Figure 1:
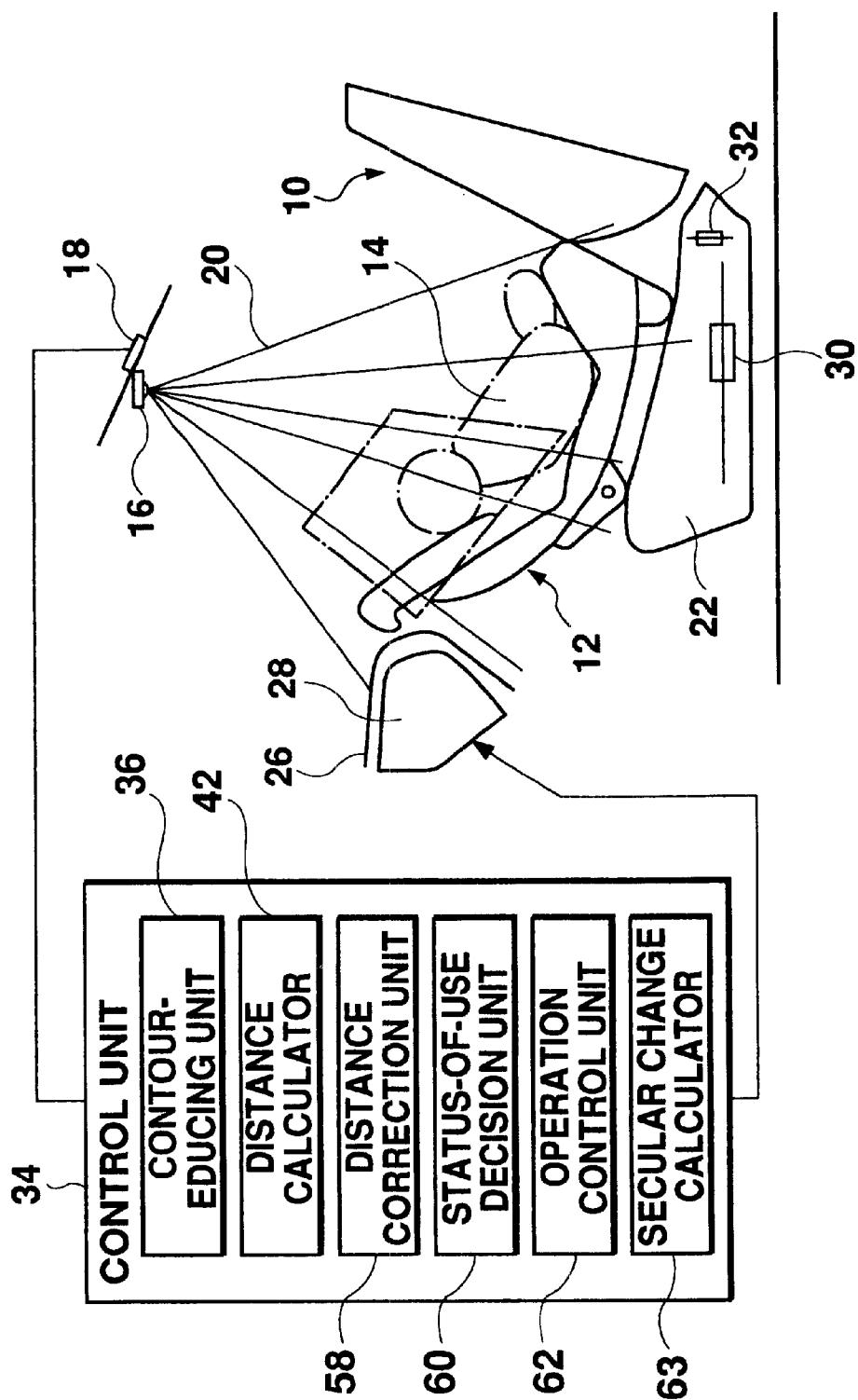
FIG. 1 is a unit configuration diagram illustrating an outline of the first embodiment of the present invention. As an example, this drawing shows that a child seat is installed backward in the front passenger seat.

FIG. 1 shows a schematic configuration of the status-of-use decision device for a seat and the passive safety device in the first embodiment of the present invention. The figure shows that a child seat 12 is put on the front passenger seat 10 for a car and a child 14 is lying on his or her back on the child seat 12. The child seat 12 is installed so that the child 14 faces toward the rear of the car. Hereinafter, the direction of such installation is referred to as backward, and conversely the direction where the child seat is installed so that the child faces toward the front is referred to as forward.

Figure 2:
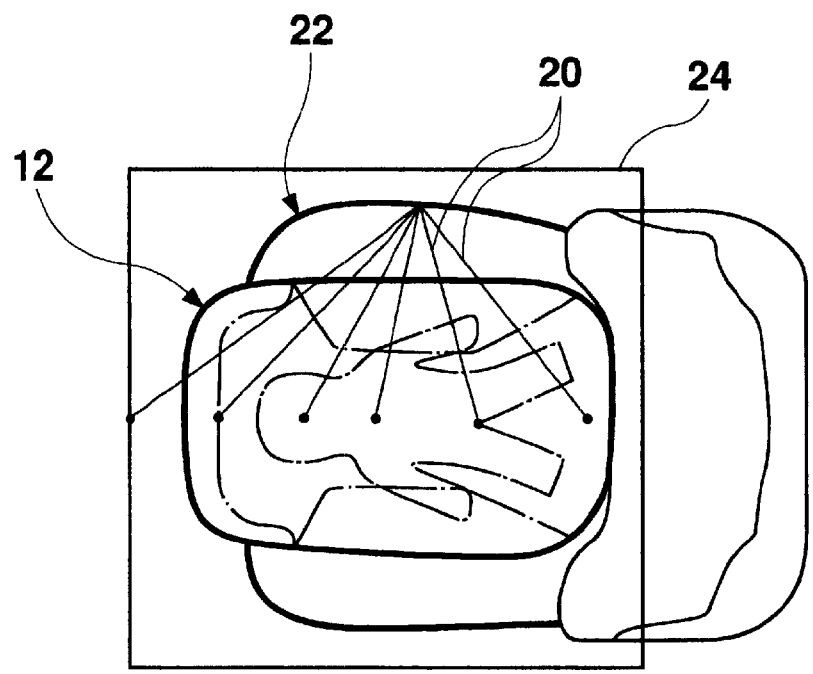

A spotlight source 16 and a camera 18 are installed on the ceiling between the front passenger seat and the driver's seat. The spotlight source 16 allows the front passenger seat and its periphery to be irradiated with spot beams 20 of multiple infrared rays. In this embodiment, as shown in FIG. 2, the direction of each of the spot beams 20 is fixed so that the irradiation point of the spot beams 20 can be aligned to almost the center line of the front passenger seat 10 on the seat. The camera 18 specifies the seat cushion 22 of the front passenger seat 10 and its front as a photographing range 24.

The inside of an instrument panel 26 in front of the front passenger seat 10 stores an air bag device 28. When a vehicle collides with an obstacle, the air bag is inflated as required, and mainly catches the head and chest of the passenger of the front passenger seat 10, and prevents the body of the passenger from colliding with the structure of the vehicle.

Besides, in this embodiment, a slide sensor 30 that detects the position in the horizontal direction of the front passenger seat and a tilt sensor 32 that detects the position in the vertical direction are provided.

The picture photographed with the camera 18 is sent to a control unit 34 as picture information. This picture information contains the irradiated image of the spot beams 20. The output of the slide sensor 30 and the output of the tilt sensor 32 are also sent to the control unit 34. The control unit 34 allows a contour-educing unit 36 to attempt to educe the contour lines (marked by thick lines in the figure) of the seat cushion 22 and the child seat 12 based on the sent picture information. The contour is educed according to the aligned shape of an educed edge by educing this picture edge, that is, a picture element whose brightness difference with adjacent picture elements is large.

Figure 3:
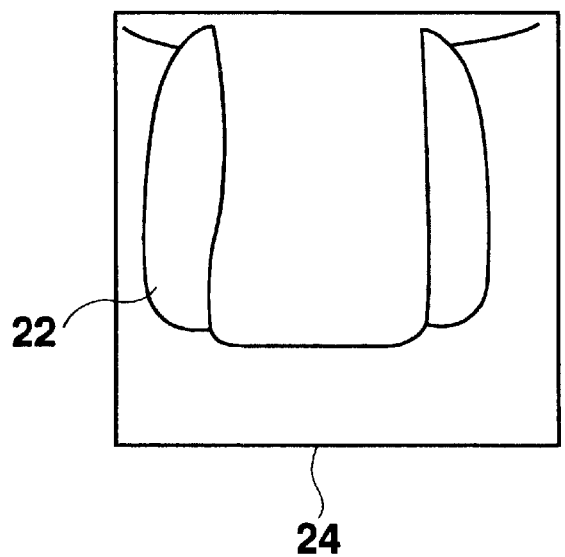
FIG. 3 shows an example illustrating the picture information in which a seat cushion is photographed.
Figure 4:
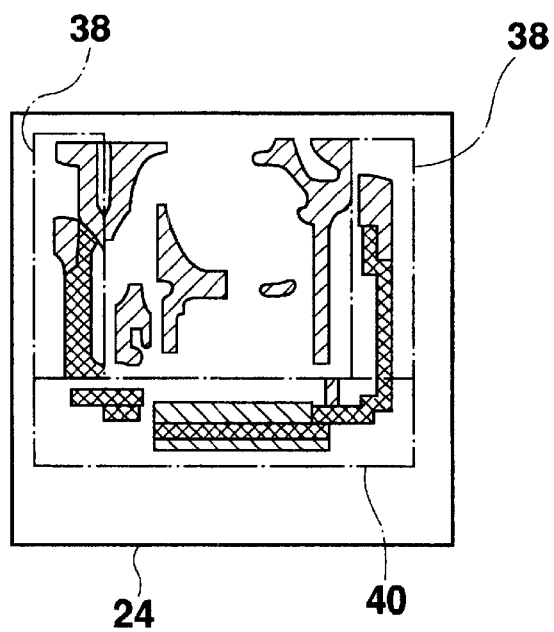
FIG. 4 is an example of the edge-processed picture and a drawing for describing the detection of the edge of a seat cushion.

Specifically, this is done as described below. FIG. 3 shows a picture in which there is no passenger or baggage on the seat cushion 22 of the front passenger seat. FIG. 4 shows an example of the picture in which the edge processing is applied to the picture of the photographed front passenger seat. Because the position of the seat cushion 22 can be recognized using the slide sensor 30 and the tilt sensor 32, the position at the edge of the seat cushion can be estimated in advance. This area is shown in FIG. 4 in a rectangle consisting of alternate long and short dashed lines. In other words, the area consists of a side end area 38 that exists at the side end of the seat cushion 22 and a front end area 40 that exists at the front end. In the side end area 38, because the edge of the seat cushion 22 is considered to extend lengthwise, the edge that extends lengthwise in sequence and exceeds the specified length can be recognized as the edge of the seat cushion 22. This edge recognizes the seat cushion 22 as a contour. Regarding the child seat 12, the contour is educed in the same way.

Figure 5:
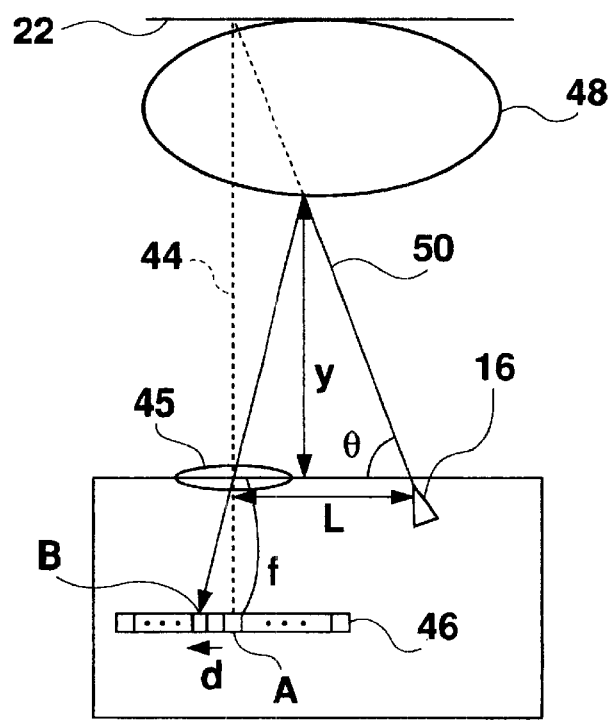
FIG. 5 is a drawing for describing the principle of distance measurement.

Moreover, a distance calculation unit 42 measures the distance for the front passenger seat and its vicinity. FIG. 5 is a drawing for describing the principle of distance measurement. If no object is put on the seat cushion 22, the beams output from the spotlight source 16 are reflected from the seat cushion 22 along the dashed line 44 in the figure, pass through a lens 45, and are focused at the point A on the picture sensor 46 of the camera 18. If an object 48 is put on the seat cushion 22, the beams progress as shown by the solid line 50 and are focused at the point B on the picture sensor 46. The distance y up to the surface of the object 48 can be calculated based the distance d between the points A and B. In other words, assuming that the distance between the spotlight source 16 and the center of the lens 45 is L, the focal point distance of the lens 45 is f, and the irradiation angle of the spotlight is θ, then the distance y is given by the following expression:

$$Y = L/(d/f + \tan^{-1} \theta)$$

The distance calculator 42 measures the distance based on the information about the position of the front passenger seat obtained from the slide sensor 30 and the tilt sensor 32 and the previously stored shape of the front passenger seat 10. If any object is put on the front passenger seat, it measures the distance based on the difference between the position of the irradiation point of the spotlight source 16 and the position of the actually obtained irradiation point.

From the obtained distance information, it can be decided whether the contour obtained as described previously is an actual object or a flat one such as a shadow projected on the seat cushion 22. Besides, as shown in FIGS. 1 and 2, if multiple spot beams 20 are provided, the presence of a child on the seat cushion 12 can also be estimated. In other words, if no child is present, the irradiation point on the child seat 12 lies almost on an arc with a protrusion downward. When a child is present, the irradiation point lies on the body of the child and unevenness is generated, thereby enabling estimation to be performed.

Figure 6:
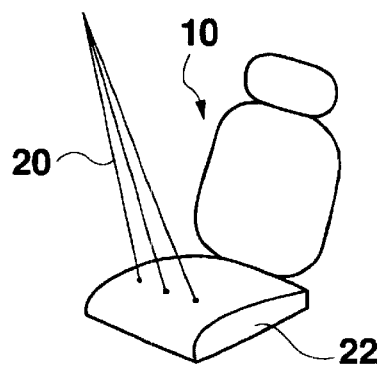
FIG. 6 is a drawing for describing the decision of the status of use of a seat using the distance measurement and illustrating that a seat on which no passenger is seated is irradiated with spot beams of lateral alignment.
Figure 7:
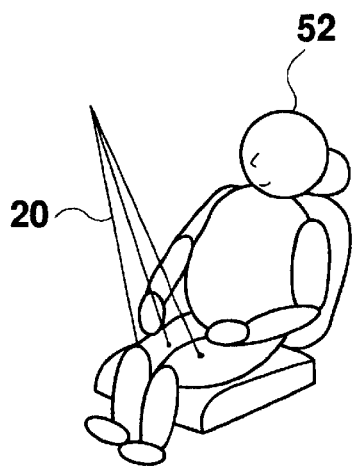
FIG. 7 is a drawing for describing the decision of the status of use of a seat using the distance measurement and illustrating that there is a passenger on the seat shown in FIG. 6.
Figure 8:
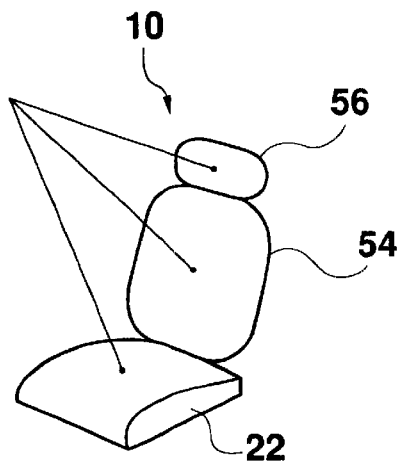
FIG. 8 is a drawing for describing the decision of the status of use of a seat using the distance measurement and illustrating that a seat on which no passenger is seated is irradiated with spot beams of lengthwise alignment.
Figure 9:
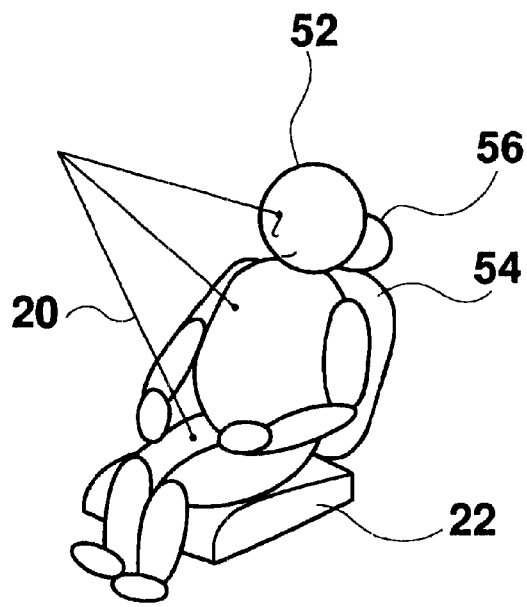
FIG. 9 is a drawing for describing the decision of the status of use of a seat using the distance measurement and illustrating that there is a passenger on the seat shown in FIG. 8.

Appropriately setting the irradiation position of the spot beams 20 enables another method of estimating status of use of the front passenger seat. For example, as shown in FIG. 6, if the vicinity of the front end of the seat cushion 22 is irradiated with the spot beams 20 arranged breadthwise, the femoral region of the passenger is irradiated with them and the presence of the passenger can be estimated from this characteristic. Besides, as shown in FIGS. 8 and 9, the presence of a passenger 52 can also be decided by the seat back 54 and head rest 56 of the front passenger seat 10 with the spot beams 20. In this case, the frame of the passenger 52 can be decided. In other words, if it is decided that there is no object on the head rest 56, the passenger might be such that his or her head does not reach the rest. In addition, if the seat back 54 is irradiated with the spot beams 20, it is desirable that the reclining sensor that detects the angle of the seat back 54 be set. The previously mentioned slide sensor 30 and the tilt sensor 32 as well as this reclining sensor are used to recognize the actual position such as the seat back 54, and the presence of the passenger can be estimated.

Figure 10:
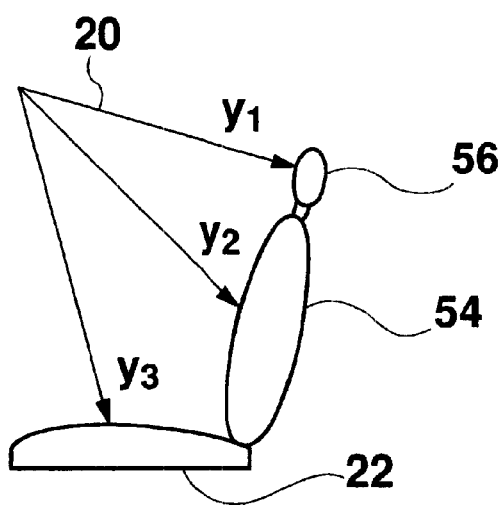
FIG. 10 is a drawing for describing the decision of the status of use of a seat using the distance measurement and illustrating that there is no passenger.

FIGS. 10 to 14B are drawings for describing the standard for estimating the status of the front passenger seat when the seat cushion 22, seat back 54, and head rest 56 are irradiated with the spot beams 20. FIG. 10 shows that the front passenger seat is vacant, where the distance up to the irradiation point of the spot beams 20 is y1, y2, y3, respectively.

FIG. 11A shows the state in which the passenger 52 is seated on the seat, where, defining that the distance up to the irradiation point is y1', y2', y3', as shown in FIG. 11B, the difference (y1−y1'), (y2−y2'), (y3−y3') when no passenger exists appears at any point. FIG. 12A shows the state in which the child seat 12 is installed forward. In this case, as shown in FIG. 12B, the difference (y1−y1') in the unit of the head rest 56 does not appear. Further, FIG. 13A shows the state in which the child seat 12 is installed backward. In this case, as shown in FIG. 13B, neither the difference (y1−y1') in the unit of the head rest 56 nor the difference (y2−y2') in the unit of the seat back 54 appears. Furthermore, FIG. 14A shows that the child seat 12 is installed forward and a child is seated on the seat. At this time, as shown in FIG. 14B, although the difference (y1−y1') in the unit of the head rest 56 does not appear, the difference (y2−y2') in the unit of the seat back 54 increases more than the case shown in FIG. 12. According to the above-mentioned trend, the status of use of the front passenger seat can be estimated.

Besides, because the position of the front passenger seat varies according to its slide, tilt, and level of reclining, the value of y1, y2, y3 is corrected with a distance correction unit 58 based on the output of the above-mentioned slide sensor 30, tilt sensor 32, and reclining sensor.

FIG. 15A shows the state in which the passenger 52 is seated obliquely. In this way, when the head is shifted from the head rest 56, as shown in FIG. 15B, the position (y1−y1'), (y2−y2'), (y3−y3') of the irradiation point of the spot beams 20 becomes approximately that of the case shown in FIG. 14B described previously. Like this, the status of use may not be decided fully using only the information about the distance measurement. A status-of-use decision unit 60 decides the status of use of the seat overall by combining the contour information. An operation control unit 62 controls the expansion of the air bag device 28 according to the decided status of use. For example, if the front passenger seat 10 is vacant, inflation of the air bag is unnecessary. Accordingly, even if collision is sensed, the air bag is controlled not to inflate.

The control unit 34 is a computer suitable for achieving the aforementioned operation according to the predetermined program. Besides, the contour can also be detected by previously constructing the edge unit of the seat cushion 22 and child seat 12 with a material that absorbs or reflects the rays of a predetermined wavelength.

In this case, it is desirable to set the predetermined wavelength beyond the visible region to avoid spoiling the design of the front passenger seat 10 and the child seat 12.

In the edge detection of the seat cushion 22, an attempt was made to set the side end area 38 and the front end area 40 matching the movement of the front passenger seat. However, by widely presetting these areas, changes in setting conforming to the movement of the front passenger seat 10 can be eliminated. In particular, this elimination is suitable when the range of movement of the front passenger seat 10 is small.

In addition, if a fatigue change calculator 63 is provided and there is no passenger or baggage on the front passenger seat 10, the stored shape of the front passenger seat 10 can also be corrected based on the shape of the front passenger seat 10 and the distance up to the irradiation point of the actually measured spot beams 20. The shape of the front passenger seat 10 may sometimes be varied due to settling of permanent fatigue as time elapses. By correcting the aging of this shape, the accuracy of decision can be improved.

Second Embodiment

Figure 16:
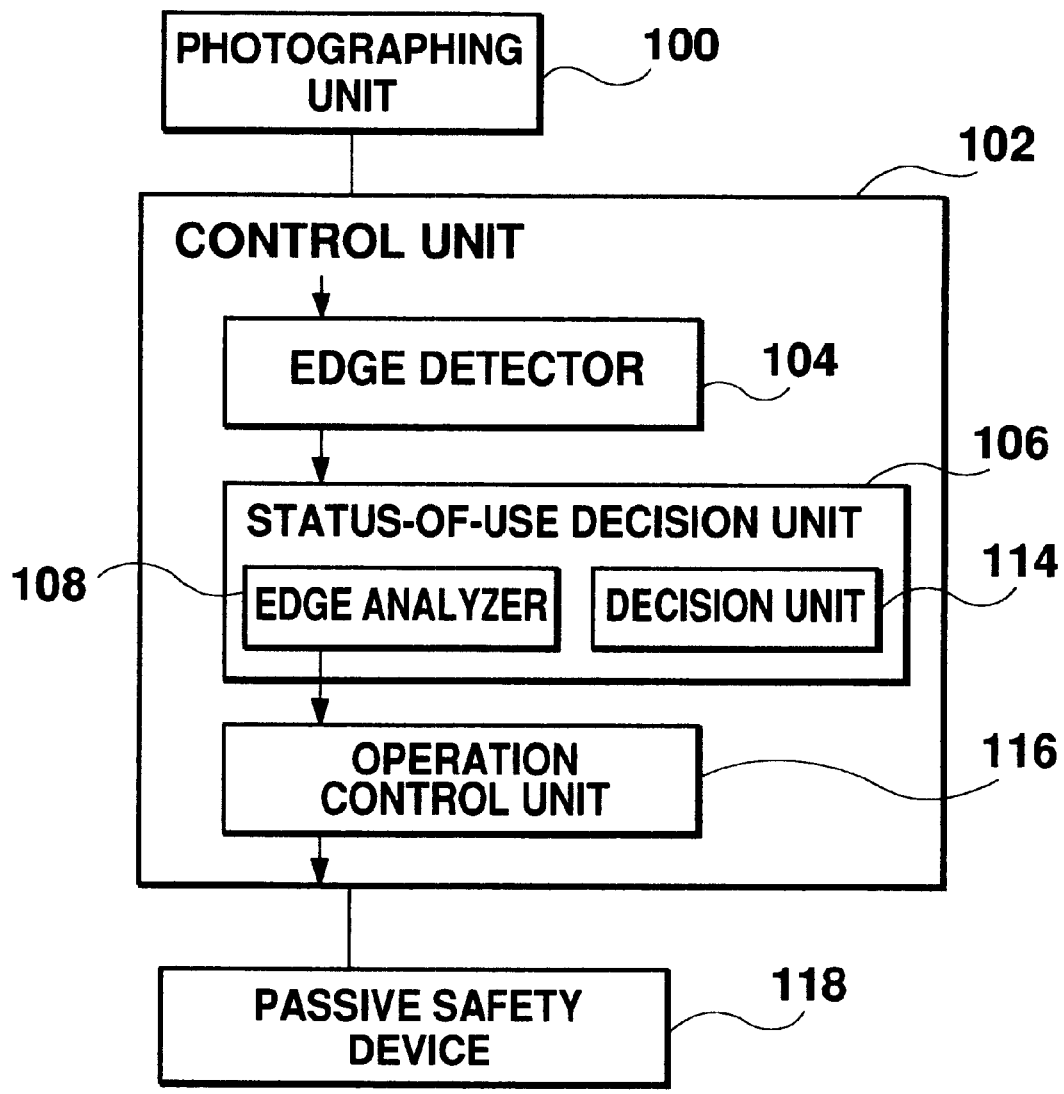
FIG. 16 is a block diagram illustrating the configuration of the principle part of the second embodiment of the present invention.

FIG. 16 shows a schematic block diagram of the second embodiment of the present invention. A photographing unit 100 corresponds to the camera 18 of the first embodiment and can photograph the front passenger seat. The picture information obtained from the photographing unit 100 is sent to a control unit 102 and edges are detected in an edge detector 104. The edges are information that corresponds to the difference of the picture information such as the brightness between adjacent picture elements. In this embodiment, a brightness difference between picture elements is defined to be an edge. If this edge is large, there is a larger difference in the brightness between the picture elements. As described in the first embodiment, if nothing is put on the front passenger seat, as shown in FIG. 4, a sharp edge (double hatched part in the drawing) that extends in the longitudinal direction appears in the side end area 38. A sharp edge that extends in the lateral direction appears in the front end area 40.

A status-of-use decision unit 106 decides the status of use of the front passenger seat from the shape of such an edge. In an edge analyzer 108 of the status-of-use decision unit 106, if the maximum length of this continuous edge and the total length of this edge exceeds each predetermined value in both the side end area 38 and the front end area 40, it is decided as the edge of the seat cushion 22. If the edge of the seat cushion 22 is detected according to the shape of this edge, it can be decided that there is no passenger on the front passenger seat.

Figure 17:
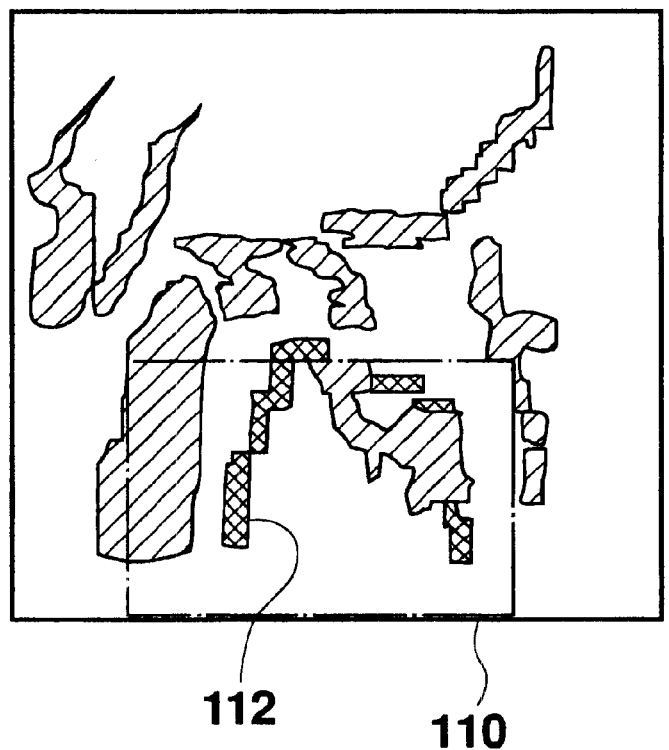
FIG. 17 shows an example of the edge-processed picture and a drawing for describing the detection of a passenger's legs.

Further, the edge analyzer 108 decides the shape of a characteristic edge when there is a passenger on the front passenger seat. FIG. 17 shows an edge image in which the lower part from the waist of a passenger sitting on the front passenger seat is photographed and to which edge processing is applied. In this case, a leg edge area 110 is set in the central part (shown by the rectangle consisting of alternate long and short dashed lines in the drawing) in the lower half of the screen. This area includes the femoral region of the seated passenger. This region has a shadow on the inside of a thigh, and an edge (leg edge) that extends almost in the longitudinal direction is generated. In FIG. 17, the double hatched part 112 that is shown almost in the center of the leg edge area 110 is the leg edge.

A decision unit 114 of the status-of-use decision unit 106 decides that there is no passenger when detects the edge of the seat cushion 22 is detected and the leg edge cannot be detected. When the leg edge is detected without detecting the edge of the seat cushion 22, it is decided that there is a passenger. In other cases, it is decided that the status of use is unknown.

An operation control unit 116 controls the operation of a passive safety device such as an air bag and a seat belt with a pretensioner based on the decision of the status-of-use decision unit 106. For example, if it is decided that there is no passenger, the operation of a passive safety device regarding the front passenger seat is unnecessary. Accordingly, the operation control unit performs control that prohibits this.

Besides, in this embodiment, the setting position of the side end area 38, front end area 40, and leg edge area 110 can also be changed matching the movement of the front passenger seat in the same way as the first embodiment.

The control unit 102 is a computer suitable for achieving the above described operation according to the predetermined program.

Third Embodiment

Figure 18:
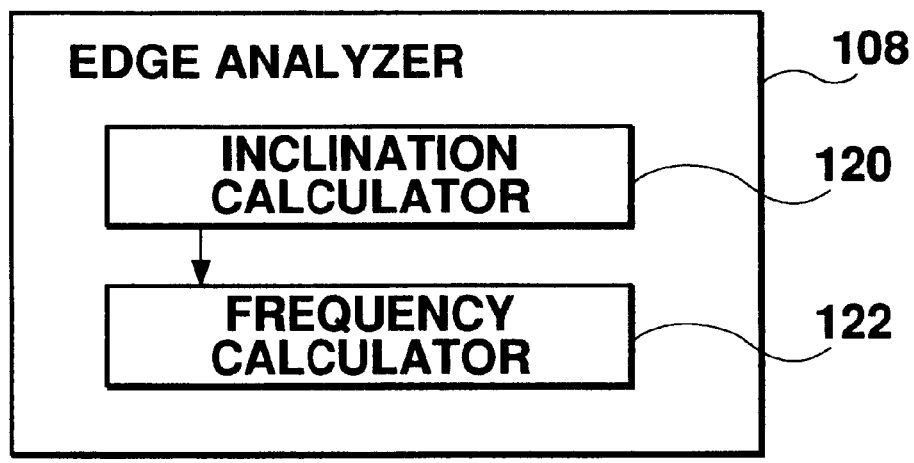
FIG. 18 is a block diagram illustrating the configuration of the principal part of the third embodiment of the present invention.

FIG. 18 is a schematic block diagram illustrating the principal part of the third embodiment related to the present invention. This embodiment differs in the configuration of the edge analyzer 108 of the second embodiment shown in FIG. 16. Accordingly, another configuration is not described.

Figure 19:
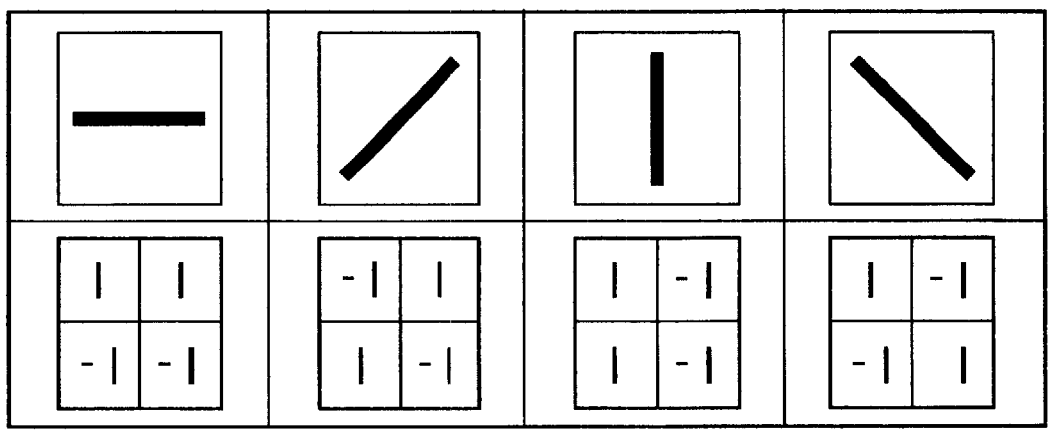
FIG. 19 is a drawing for describing the calculation of the edge inclination.

An inclination calculation unit 120 of the edge analyzer 108 calculates the inclination of an edge for all picture elements. For this embodiment, the inclination is classified into four types: horizontal, right-ascending 45 degrees, vertical, and right-descending 45 degrees shown at the top of FIG. 19. Specifically, it is partially classified as follows. The filter at the bottom of FIG. 19 is applied to the picture element (x,y). Defining that the brightness of the picture element (x,y) is i (x,y), the value of the picture element on the upper left of the filter is a, the value on the upper right is b, the value on the lower left is c, and the value on the lower right is d, calculate $$E = a \cdot i(x,y) + b \cdot i(x+1,y) + c \cdot i(x,y+1) + d \cdot i(x+1,y+1)$$

for each of the illustrated four filters, and consider the inclination for the filters that give the maximum E as that at the position of the picture element (x,y).

Figure 20:
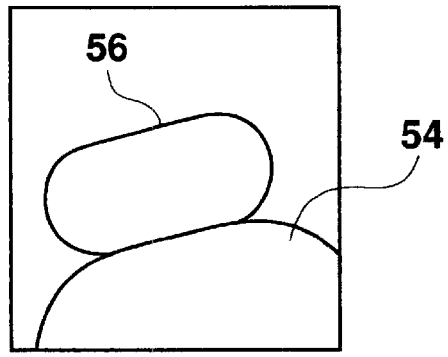
FIG. 20 is a drawing for describing the decision of the status of use of a seat according to the edge inclination and illustrating the picture when there is no passenger.
Figure 21:
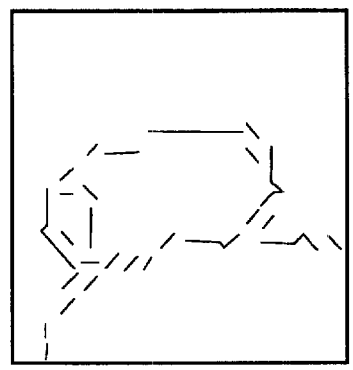
FIG. 21 is a drawing for describing the decision of the status of use of a seat according to the edge inclination and illustrating the edge picture when there is no passenger.
Figure 22:
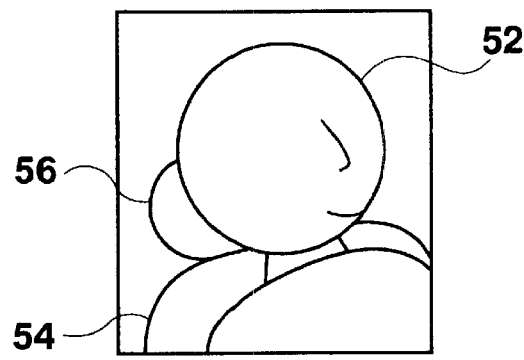
FIG. 22 is a drawing for describing the decision of the status of use of a seat according to the edge inclination and illustrating the picture when there is a passenger.
Figure 23:
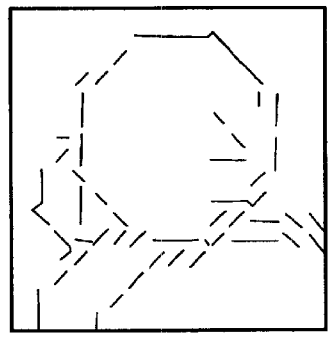
FIG. 23 is a drawing for describing the decision of the status of use of a seat according to the edge inclination and illustrating the edge picture when there is a passenger.
Figure 24:
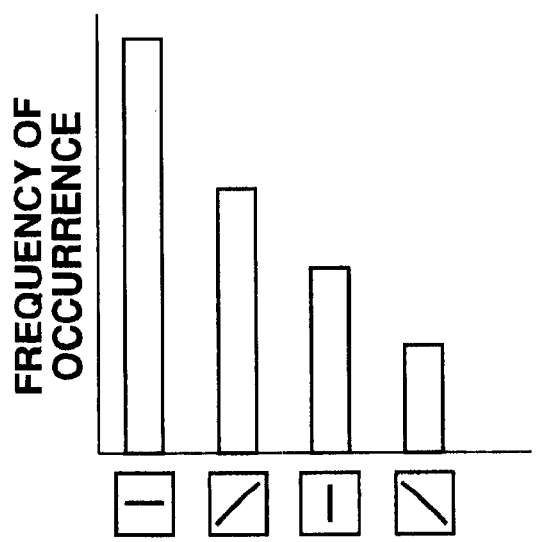
FIG. 24 is a drawing for describing the decision of the status of use of a seat according to the edge inclination and illustrating the frequency of occurrence for each edge type shown in FIG. 21.

FIG. 20 shows an example of the picture on which the top of the seat back 54 of the front passenger seat and the head rest 56 are photographed. When the edge inclination of this picture is calculated, an edge picture is obtained as shown in FIG. 21. Similarly, if there is a passenger 52 as shown in FIG. 22, the edge picture can be obtained as shown in FIG. 23. A frequency calculator 122 calculates the frequency of occurrence for each inclination of this edge. This example is shown in FIG. 24 if there is no passenger as shown in FIG. 21 and in FIG. 25 when there is a passenger as shown in FIG. 23. Because the distribution of the frequency of occurrence for each inclination differs according to the status of use of the front passenger seat as described above, the status of use of the front passenger seat can be decided based on the distribution. For example, if the frequency of occurrence of a lateral edge is high, the contour of the head rest 56 is assumed to be reflected. Accordingly, it is decided that there is no passenger.

FIGS. 26A to 30B show examples of the different photographing range from those for FIG. 20. The photographing range is a range where the seat cushion 22 is located almost in the center of the screen and the bottom of the seat back 54 is accommodated. Each status of use is shown below. FIGS. 26A and B show that there is no passenger (vacant seat), FIGS. 27A and B show that there is a passenger (adult), FIGS. 28A and B show forward child seats (without a child), FIGS. 29A and B show backward child seats (without a child), and FIGS. 30A and B show forward child seats (with a child). FIGS. 26A, 27A, 28A, 29A, and 30A show examples of the photographed picture in the status of use described. The edge processing is applied to this picture and the edge is classified into the four edge inclinations shown in FIG. 19. These classified edge pictures are shown in FIGS. 26B, 27B, 28B, 29B, and 30B. Besides, the frequency calculator 122 counts the lateral edge contained in the row of a picture element and this result is shown in the histogram on the bottom of FIGS. 26B, 27B, 28B, 29B, and 30B. The frequency calculator 122 also counts the longitudinal edge contained in the column of a picture element and this result is shown in the histogram on the right of FIGS. 26B, 27B, 28B, 29B, and 30B. The characteristic amount regarding each status of use of the front passenger seat is extracted from these two histograms and five different types of status can be discriminated.

As described above, the frequency of the edge processing and edge inclination was calculated for the entire photographed picture. If an area in which a characteristic edge picture appears is known previously, the processing for only this area can be performed. For example, the entire front passenger seat is photographed and the area in the vicinity of the head rest and seat cushion are set from this picture information. Thus, the aforementioned processing can be performed for this area. By doing so, the image processing load can be reduced. This area can be set based on the movement of the front passenger seat, that is, the output of the slide sensor 30, tilt sensor 32, and reclining sensor. In this case, the desired area can be accurately set and the accuracy of decision of the status of use can be improved.

According to the examples shown in FIGS. 26A to 30B, although the edge with a predetermined inclination was counted for each pixel row, the screen is divided into multiple rows and the edge with a predetermined inclination can be counted for each row.

Fourth Embodiment

Figure 31:
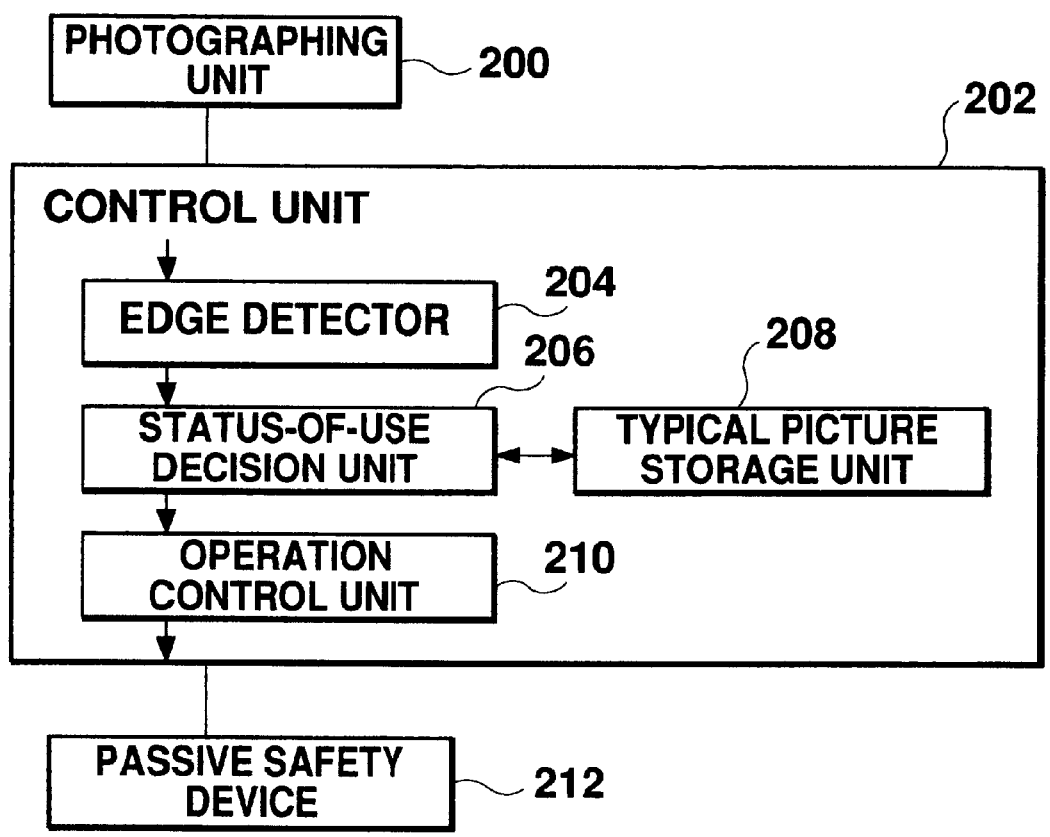
FIG. 31 is a block diagram illustrating the configuration of the principal part of the fourth embodiment of the present invention.

FIG. 31 is a schematic block diagram illustrating the principal part of the fourth embodiment related to the present invention. This embodiment differs in the operation of the control unit 102 of the second embodiment shown in FIG. 16.

A photographing unit 200 corresponds to the camera 18 of the first embodiment and photographs the picture containing at least a part of the front passenger seat. The obtained picture information is sent to a control unit 202, and the edge information is obtained by the same edge detection processing as described above using an edge detection unit 204. The obtained edge information is, for example, shown in FIG. 17. A status-of-use decision unit 206 compares this edge information with typical pictures that were previously stored in a typical picture storage unit 208. It selects a typical picture with the highest degree of similarity and decides the status of use to which this typical picture belongs as the current status of use. The typical picture storage unit 208 stores an image or multiple images of typical pictures for each status of use of the seat as shown in FIG. 32. The typical picture shows the characteristics of the status of use by processing multiple pictures instead of a simple photographed picture.

When the status of use is decided, the operation control unit 210 controls the operation of a passive safety device 212 such as an air bag based on the decision. For example, if it is decided that there is no passenger in the front passenger seat, operation of the passive safety device is unnecessary. Accordingly, this is prohibited.

Besides, in this embodiment, the edge processing was applied to the photographed picture and the similarity was decided using the obtained edge picture. The similarity can be decided by comparing the picture before the edge processing with the typical picture. If a comparison is made using the edge picture, the stored typical picture can be substituted for the edge picture.

Besides, the accuracy of decision can be improved by accurately aligning the position of the photographed picture and typical picture based on the position of the front passenger seat detected with the slide sensor 30. The control unit 202 is a computer suitable for achieving the above described operation according to the predetermined program.

Fifth Embodiment

Figure 33:
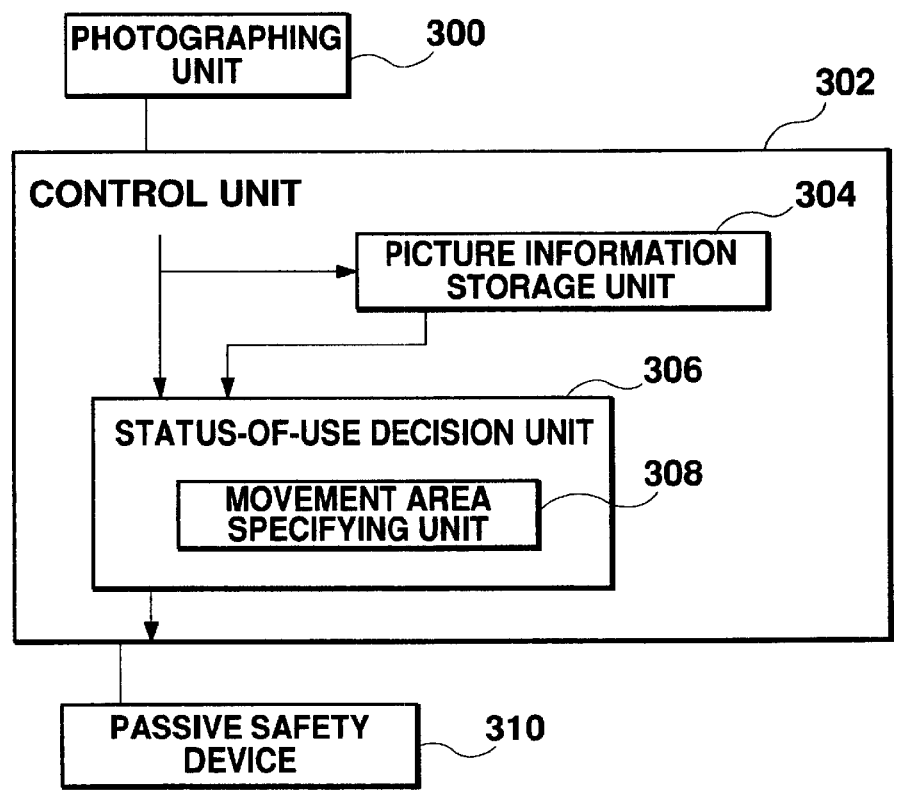
FIG. 33 is a block diagram illustrating the configuration of the principal part of the fifth embodiment of the present invention.

FIG. 33 is a schematic block diagram illustrating the principal part of the fifth embodiment related to the present invention. This embodiment differs in the operation of the control unit 102 of the second embodiment shown in FIG. 16.

A photographing unit 300 corresponds to the camera 18 of the first embodiment and photographs the picture including at least a part of the front passenger seat. The obtained picture information is sent to a control unit 302 and then to a picture information storage unit 304 and a status-of-use decision unit 306. The picture information storage unit 304 temporarily stores the picture. After the predetermined time has elapsed, it sends the stored picture information according to the status-of-use decision unit 306. The status-of-use decision unit 306 obtains the difference picture in which the difference is subtracted for each corresponding picture element from the following information. The information indicates the picture information photographed at the current time and that before the predetermined time stored in the picture information storage unit 304.

Figure 34:
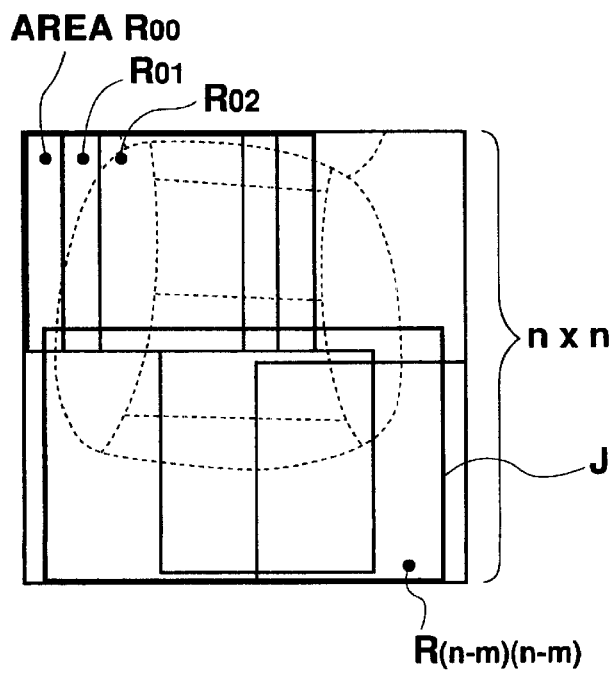
FIG. 34 is a diagram for describing the area setting related to the detection of movement.

A movement area specification unit 308 specifies the area whose difference value is large. Specifically, it is performed as follows. As shown in FIG. 34, the area R with a small (number of pixels m*m) is set for the screen with the number of pixels n*n. First, the area R is set to the upper-left corner of the screen (area R00). The total S00 of the difference value in this area is calculated. The area is then shifted right by one picture element (area R01) and the total S01 of the difference value in this area is calculated. This process is repeated sequentially until the area R is moved to the lower-right corner (area R (n–m) (n–m)). The area having the largest difference value is selected as the movement area.

The status-of-use decision unit 306 decides "there is a movement" when the movement area is in the illustrated decision area J. If the decision of "there is a movement" is performed within the predetermined time, it decides that "there is a passenger". The decision area J is an area where the movement frequently appears if the passenger sits in the seat and the knee of the passenger is centered in the area. For this decision area J, it is desirable that the position be changed according to the movement of the front passenger seat. Based on the decision of this status-of-use decision unit 306, a passive safety device 310 such as an air bag device is controlled. This change can be performed based on the output of the slide sensor 30 in the same way as the above described embodiment.

Sixth Embodiment

Figure 35:
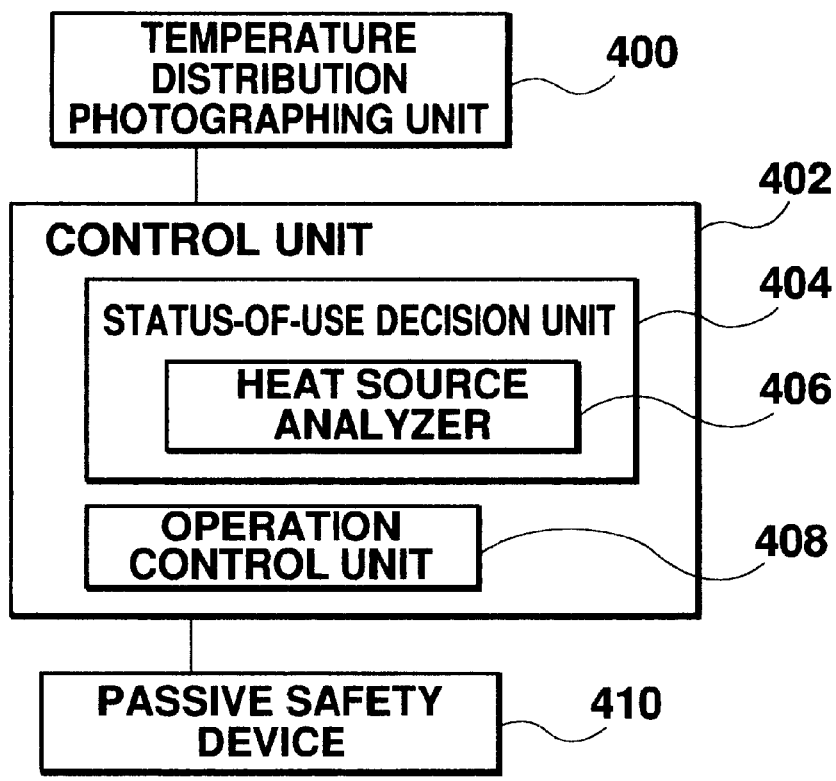
FIG. 35 is a block diagram illustrating the configuration of the principal part of the sixth embodiment of the present invention.

FIG. 35 is a schematic block diagram illustrating the principal part of the sixth embodiment related to the present invention. This embodiment differs in the photographing unit 100 and the control unit 102 of the second embodiment shown in FIG. 16.

A temperature distribution photographing unit 400 is a photographing device with sensitivity in the infrared region. It calculates the temperature of an object point based on the wavelength of infrared rays and outputs it as picture information. The picture information indicating this temperature distribution is sent to a control unit 402.

Figure 36:
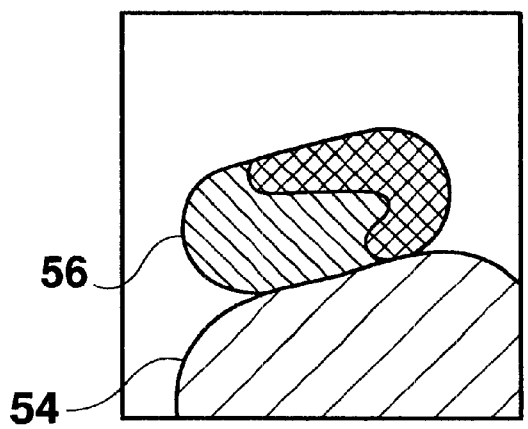
FIG. 36 shows an example of the temperature distribution picture when there is no passenger.
Figure 37:
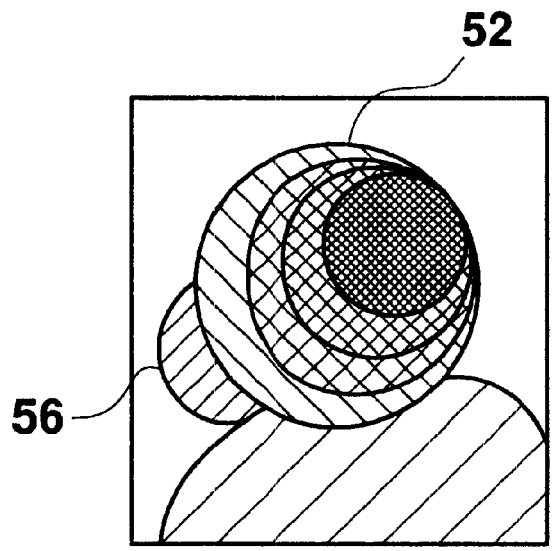
FIG. 37 shows an example of the temperature distribution picture when there is a passenger.
Figure 38:
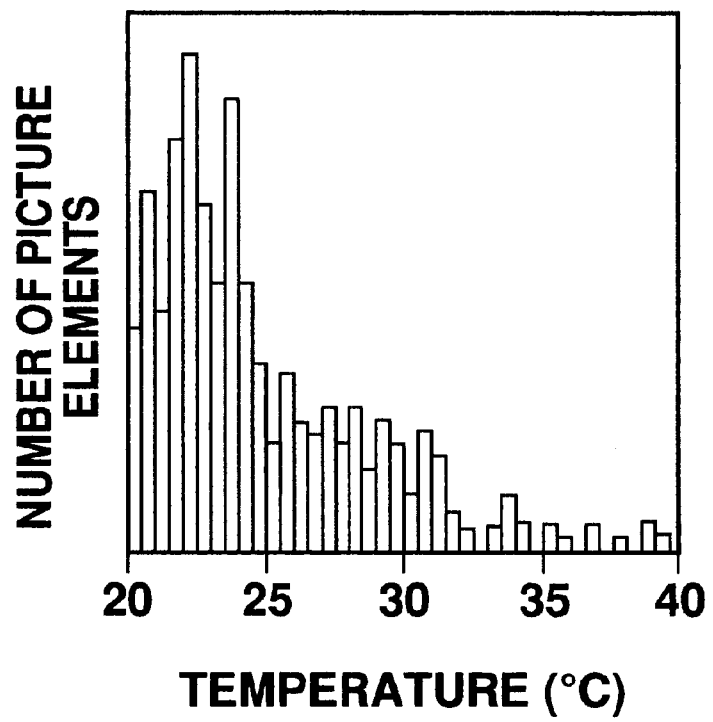
FIG. 38 is an explanatory diagram of the method for deciding the status of use of a seat from the temperature distribution picture and illustrating the number of picture elements for each temperature when there is no passenger.
Figure 39:
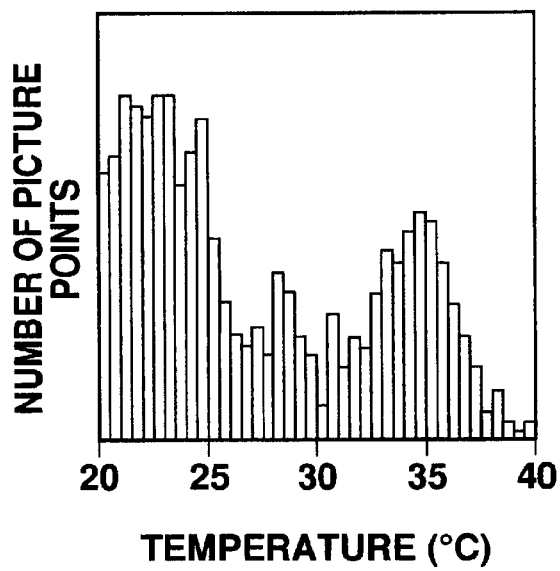
FIG. 39 is an explanatory diagram of the method for deciding the status of use of a seat from the temperature distribution picture and illustrating the number of picture elements for each temperature when there is a passenger.

FIGS. 36 and 37 show examples of an image photographed with the temperature distribution photographing unit 400. The areas of higher temperature are indicated by dense hatching. FIG. 36 shows that the top of the seat back 54 for the front passenger seat and the head rest 56 are photographed without a passenger. FIG. 37 shows that there is a passenger and a high-temperature area exists in the face unit of the passenger. A heat source analyzer 406 of the status-of-use decision unit 404 counts the number of pixels for each of these picture temperatures. These results are shown in FIGS. 38 and 39. FIG. 38 shows that there is no passenger and FIG. 39 that there is a passenger. As shown in the figure, when there is a passenger, the number of pixels increases before and after 35 degrees Celsius. Accordingly, the status-of-use decision 404 decides the status of use of the seat and the presence of the passenger. An operation control unit 408 controls the operation of a passive safety device 410 such as an air bag based on the above decision. For example, if it is decided that there is no passenger, inflation of the air bag is unnecessary. Accordingly, it performs control to prohibit the operation.

Figure 40:
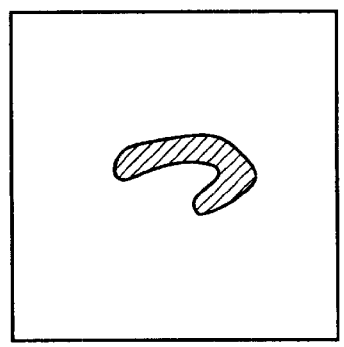
FIG. 40 is an explanatory diagram of the method for deciding the status of use of a seat from the temperature distribution picture and illustrating the picture from which the picture element is educed at the temperature exceeding the predetermined value when there is no passenger.
Figure 41:
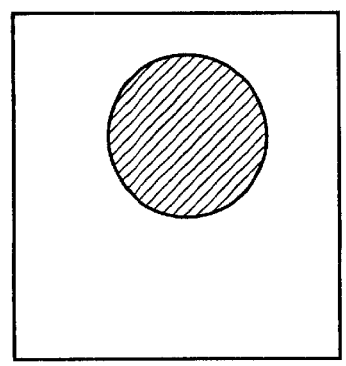
FIG. 41 is an explanatory diagram of the method for deciding the status of use of a seat from the temperature distribution picture and illustrating the picture from which the picture element is educed at the temperature exceeding the predetermined value when there is a passenger.

Instead of counting the number of picture elements, the heat source analyzer 406 educes the picture exceeding the predetermined temperature and can also decide the status of use of the seat based on the shape. FIGS. 40 and 41 show examples in which the picture element that exceeds the predetermined temperature was educed. FIG. 40 corresponds to FIG. 36 and FIG. 41 corresponds to FIG. 37. FIG. 41 shows that the area exceeding the predetermined temperature is the shape and size of a person's face. Hence, the status-of-use decision unit 404 can decide that there is a passenger.

The control unit 302 is a computer suitable for achieving the above described operation according to the predetermined program.

Other Embodiments

Besides, the status of use of the front passenger seat can be decided by appropriately combining the above described embodiment and making an overall decision for multiple decisions. The overall decision can be made by predetermined weighting of each decision.

Figure 42:
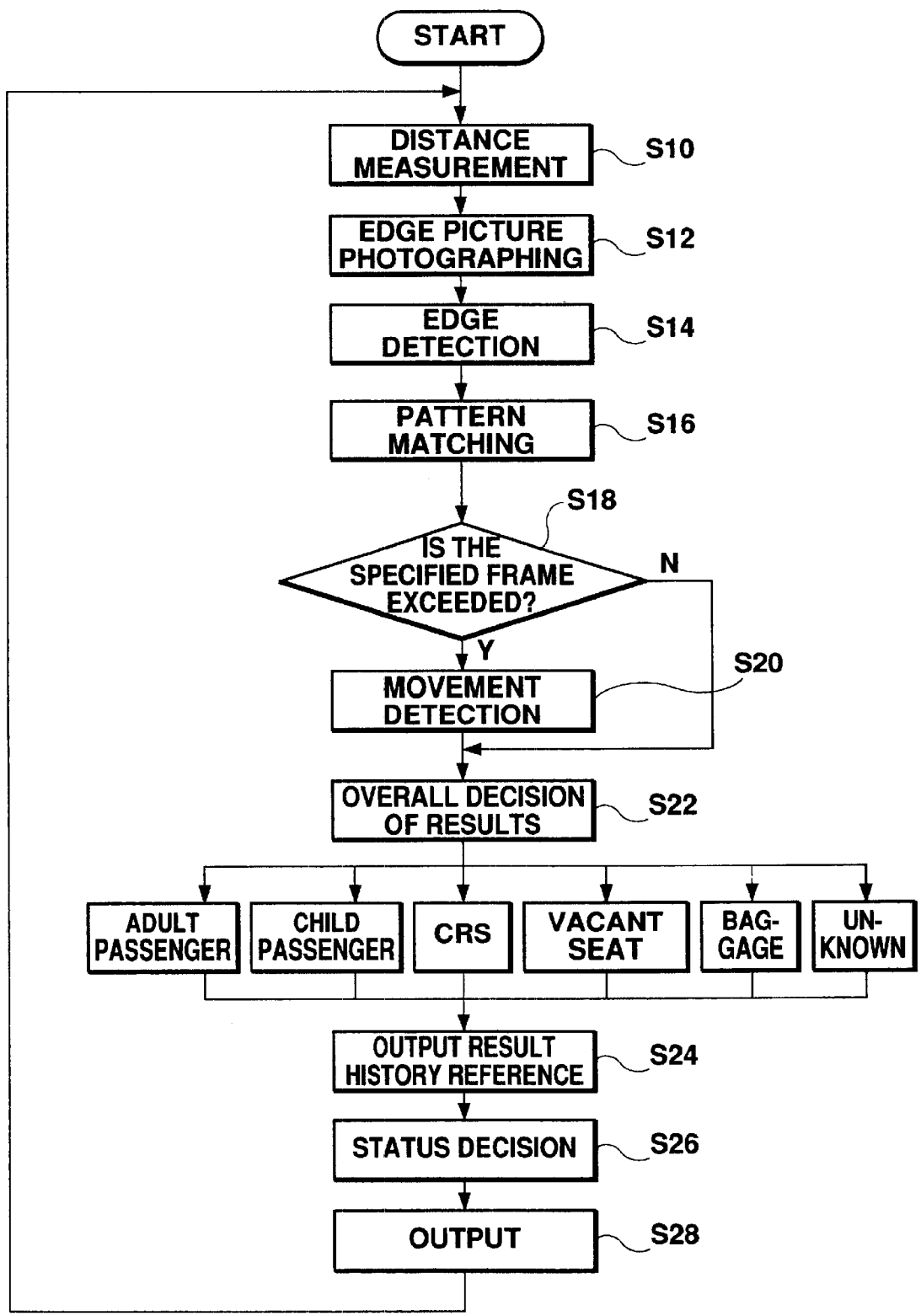
FIG. 42 shows an example of the flowchart when the status of use of a seat is decided overall using multiple methods.

Specifically, for example, control can be performed based on the flowchart shown in FIG. 42. First, the distance for the front passenger seat and its periphery are measured (S10). If the detected distance information coincides with the shapes of the previously stored front passenger seat and its periphery, it can be decided that there is no passenger at least in the front passenger seat and its periphery and also that there is no baggage (seat is vacant). Then, the front passenger seat and its periphery are photographed and the edge-processed picture is obtained (S12). For example, a characteristic edge is detected from this edge picture according to the status of use (S14). For example, the edge generated from the edge of the seat cushion of the front passenger seat and the edge generated from the femoral region of the passenger are detected. Moreover, the edge picture is compared with the typical picture stored for each status of use (pattern matching) and the typical picture with the highest similarity is selected (S16).

Then, after the previous movement has been decided, it is decided whether the number of pictures obtained in S12 (the number of frames) has reached the predetermined number (S18). If the predetermined number is reached, the preceding stored information and the picture photographed this time are compared and the area where movement can be seen in the picture is specified (S20). The status of use is decided according to the location of the area in which this movement can be seen. If the number of frames photographed in step S18 does not reach the predetermined number, no movement is detected.

The status of use obtained in each step described above is decided overall (S22) and the status in which an adult is seated on the seat, a child is seated on the seat, a child seat (CRS) is installed, the seat is vacant, or baggage is put on the seat is decided. The result of this overall decision is compared with the history of past decision results (S24). At this time, if a result that differs from the previous decision results is obtained, change is performed after checking that the results are maintained for the predetermined time (S26). The status of use is output (S28) and the passive safety device controls the operation based on this output.

As described above, the accuracy can be improved by deciding the status of use using multiple methods.

What is claimed is:

1. A decision device for a vehicle, said device comprising:

a ranging unit configured and arranged to measure a plurality of distances between a predetermined overhead point and an occupant of a seat, each of the plurality of distances being determined with respect to an image of a spot illuminated by a corresponding beam, each beam being directed along a different angle from the predetermined overhead point;

an imaging unit configured and arranged to obtain image information of an area that includes at least a part of the seat; and an occupant type discriminator configured and arranged to determine the occupant type based on both the image information and the plurality of distances, wherein the ranging unit includes a spotlight source configured and arranged to emit the corresponding beams.

2. The decision device according to claim 1, said device further comprising a seat sensor configured and arranged to sense a disposition of the seat, said disposition including one among (1) a position of at least a part of the seat relative to the predetermined overhead point and (2) an orientation of the seat.

3. The decision device of claim 1, wherein at least one among the different angles is selected to intersect a head rest of the seat.

4. The decision device according to claim 1, wherein the occupant type includes one among a passenger and an object.

5. The decision device according to claim 1, wherein the ranging unit includes an infrared detector configured and arranged to receive a reflection of at least one of the corresponding beams.

6. The decision device according to claim 1, said device further comprising a contour extractor configured and arranged to extract a contour from the image information, wherein the occupant type discriminator is configured and arranged to determine the occupant type based on the shape of the contour.

7. The decision device according to claim 1, wherein at least a portion of a surface of the seat has wavelength-dependent reflective properties.

8. The decision device according to claim 1, wherein at least a portion of a surface of the seat has enhanced reflectivity in a nonvisible wavelength range.

9. The decision device according to claim 1, wherein the different angles are selected to intersect a cushion of the seat, a back of the seat, and a head rest of the seat.

10. The decision device according to claim 1, wherein the ranging unit is further configured and arranged to obtain the plurality of distance measurements while the occupant is stationary.

11. The decision device according to claim 1, said device further comprising a contour extractor configured and arranged to extract a contour from the image information, wherein the occupant type discriminator is configured and arranged to determine the occupant type based on the shape of the contour.

12. The decision device according to claim 1, wherein at least a portion of a surface of the seat has enhanced reflectivity in a nonvisible wavelength range.

13. A decision device for a vehicle, said device comprising:

an illumination source configured and arranged to cast an illumination pattern upon a seat, said illumination pattern distinguishing a first portion of the seat illuminated by the illumination source from a second portion of the seat not illuminated by the illumination source;

a camera configured and arranged to output a picture representing a distribution of intensity over an area of the seat that is two-dimensional in a plane orthogonal to an imaging axis of the camera and that includes the first and second portions, said picture including picture information of the first portion of the seat and picture information of the second portion of the seat;

a distance calculator configured and arranged to calculate a plurality of distances between the seat and the camera, said plurality of distances being based on the picture information of the first portion of the seat;

a feature extractor configured and arranged to detect features within the picture information of the second portion of the seat; and an occupant type discriminator configured and arranged to determine an occupant type based on both the plurality of distances and the detected features.

14. The decision device according to claim 13, wherein said feature extractor is configured and arranged to detect at least one edge in the picture, said at least one edge being based on brightness differences between values of adjacent picture elements.

15. The decision device according to claim 14, wherein said feature extractor is configured and arranged to extract a contour from the picture information of the second portion of the seat.

16. The decision device according to claim 13, said device further comprising:

a seat sensor configured and arranged to sense a disposition of the seat, said disposition including one among (1) a position of at least a part of the seat relative to the distance calculator and (2) an orientation of the seat.

17. The decision device according to claim 16, said device further comprising:

a distance correction unit configured and arranged to correct at least one among the plurality of distances according to the sensed disposition of the seat.

18. The decision device according to claim 17, said device further comprising:

a fatigue change calculator configured and arranged to output a fatigue change correction to a stored shape of a seat, wherein said distance correction unit is further configured and arranged to correct at least one among the plurality of distances according to the fatigue change correction.

19. The decision device according to claim 13, wherein at least a portion of a surface of the seat has wavelength-dependent reflective properties.

20. The decision device according to claim 19, wherein at least a portion of a surface of the seat has enhanced reflectivity in a nonvisible wavelength range.

21. A decision device for a vehicle, said device comprising:

an illumination source configured and arranged to cast an illumination pattern upon a seat, said illumination pattern distinguishing a first portion of the seat illuminated by the illumination source from a second portion of the seat not illuminated by the illumination source;

a camera configured and arranged to output a picture representing a distribution of intensity over an area of the seat that is two-dimensional in a plane orthogonal to an imaging axis of the camera and that includes the first and second portions, said picture including picture information of the first portion of the seat and picture information of the second portion of the seat;

a distance calculator configured and arranged to calculate a plurality of distances between the seat and the camera, said plurality of distances being based on the picture information of the first portion of the seat; and an occupant type discriminator configured and arranged to determine an occupant type based on both the plurality of distances and the picture information of the second portion of the seat.

22. The decision device according to claim 21, said device further comprising:

a feature extractor configured and arranged to detect features within the picture information of the second portion of the seat, wherein the occupant type discriminator is configured and arranged to determine an occupant type based on both the detected features and the plurality of distances.

23. The decision device according to claim 22, wherein said feature extractor is configured and arranged to detect at least one edge in the picture, said at least one edge being based on brightness differences between values of adjacent picture elements.

24. The decision device according to claim 23, wherein said feature extractor is configured and arranged to extract a contour from the picture information of the second portion of the seat.

25. The decision device according to claim 21, said device further comprising:

a seat sensor configured and arranged to sense a disposition of the seat, said disposition including one among (1) a position of at least a part of the seat relative to the distance calculator and (2) an orientation of the seat.

26. The decision device according to claim 25, said device further comprising:

a distance correction unit configured and arranged to correct at least one among the plurality of distances according to the sensed disposition of the seat.

27. The decision device according to claim 26, said device further comprising:

a fatigue change calculator configured and arranged to output a fatigue change correction to a stored shape of a seat, wherein said distance correction unit is further configured and arranged to correct at least one among the plurality of distances according to the fatigue change correction.

28. The decision device according to claim 21, wherein at least a portion of a surface of the seat has wavelength-dependent reflective properties.

29. The decision device according to claim 28, wherein at least a portion of a surface of the seat has enhanced reflectivity in a nonvisible wavelength range.

* * * * *

UNITED STATES PATENT AND TRADEMARK OFFICE
CERTIFICATE OF CORRECTION

PATENT NO. : 6,480,616 B1  Page 1 of 1
DATED : November 12, 2002
INVENTOR(S) : Hata et al.

It is certified that error appears in the above-identified patent and that said Letters Patent is hereby corrected as shown below:

<u>Title page,</u>
Item [56], References Cited, U.S. PATENT DOCUMENTS,
Please add the following patents:
-- 5,528,698    06/1996    Kamei et al.    382/100
   5,071,160    12/1991    White et al.    280/735
   5,118,134    06/1992    Mattes et al.   280/735
   5,161,820    11/1992    Vollmer         280/730
   5,330,226    07/1994    Gentry et al.   280/735
   5,413,378    05/1995    Steffens, Jr. et al.  280/735
   5,531,472    12/1997    Takahashi       280/735 --

FOREIGN PATENT DOCUMENTS,
Please add the following references:
--  JP  6-206514    07/1994
    JP  6-293227    10/1994
    JP  4-25706     01/1992
    JP  60-158304   08/1985
    JP  7-329639    12/1995
    JP  8-290751    11/1996
    JP  8-507020    07/1996
    WO 95/018028    07/1995 --

Signed and Sealed this

Twenty-ninth Day of July, 2003

JAMES E. ROGAN
*Director of the United States Patent and Trademark Office*